United States Patent
Weber et al.

(10) Patent No.: US 9,982,878 B2
(45) Date of Patent: May 29, 2018

(54) CONVERTER-COOLING ELEMENT ASSEMBLY WITH METALLIC SOLDER CONNECTION

(71) Applicant: SCHOTT AG, Mainz (DE)

(72) Inventors: Urban Weber, Weiler bei Bingen (DE); Volker Hagemann, Klein-Winternheim (DE); Peter Brix, Mainz (DE); Michael Kluge, Offenbach am Main (DE)

(73) Assignee: Schott AG, Mainz (DE)

( * ) Notice: Subject to any disclaimer, the term of this patent is extended or adjusted under 35 U.S.C. 154(b) by 284 days.

(21) Appl. No.: 15/041,471

(22) Filed: Feb. 11, 2016

(65) Prior Publication Data

US 2016/0245494 A1    Aug. 25, 2016

Related U.S. Application Data

(63) Continuation of application No. PCT/EP2014/065680, filed on Jul. 22, 2014.

(30) Foreign Application Priority Data

Aug. 12, 2013    (DE) .................. 10 2013 013 296

(51) Int. Cl.
*H01S 3/00*    (2006.01)
*F21V 29/502*    (2015.01)
(Continued)

(52) U.S. Cl.
CPC .......... *F21V 29/502* (2015.01); *C04B 37/003* (2013.01); *C04B 37/026* (2013.01);
(Continued)

(58) Field of Classification Search
None
See application file for complete search history.

(56) References Cited

U.S. PATENT DOCUMENTS 7,700,967 B2 *    4/2010    Zhang .................. H01L 33/507
                                                       257/99
8,708,511 B2 *    4/2014    Kawakami ............... F21V 9/14
                                                       362/283
(Continued)

FOREIGN PATENT DOCUMENTS

CN         102187485 A      9/2011
DE    102007010872 A1      9/2008
(Continued)

OTHER PUBLICATIONS

English translation of International Search Report for corresponding International Application No. PCT/EP2014/065680 dated Oct. 14, 2014.
(Continued)

*Primary Examiner* — Rhonda Peace
(74) *Attorney, Agent, or Firm* — Ohlandt, Greeley, Ruggiero & Perle, LLP

(57) ABSTRACT

An assembly is provided that includes a ceramic converter for converting light having a first wavelength into light having a second wavelength, a metal-containing reflective coating, and a cooling element. The surface of the ceramic converter is at least partly coated with the metal-containing reflective coating. The coating dissipates the heat from the converter into the cooling element. The cooling element and the metal-containing reflective coating are connected to one another by a metallic solder connection.

27 Claims, 9 Drawing Sheets

(51) Int. Cl.
  *G02B 5/02* (2006.01)
  *C04B 37/02* (2006.01)
  *F21V 29/70* (2015.01)
  *C04B 37/00* (2006.01)
  *F21V 7/22* (2018.01)
  *F21V 13/08* (2006.01)
  *B23K 1/20* (2006.01)
  *B23K 35/30* (2006.01)
  *B23K 37/06* (2006.01)

(52) U.S. Cl.
  CPC ............... *F21V 7/22* (2013.01); *F21V 13/08* (2013.01); *F21V 29/70* (2015.01); *G02B 5/0236* (2013.01); *G02B 5/0268* (2013.01); *G02B 5/0294* (2013.01); *B23K 1/203* (2013.01); *B23K 35/3006* (2013.01); *B23K 37/06* (2013.01); *C04B 2235/36* (2013.01); *C04B 2235/5436* (2013.01); *C04B 2235/72* (2013.01); *C04B 2237/10* (2013.01); *C04B 2237/123* (2013.01); *C04B 2237/125* (2013.01); *C04B 2237/407* (2013.01)

(56) References Cited

U.S. PATENT DOCUMENTS

| | | | |
|---|---|---|---|
| 9,359,260 B2 * | 6/2016 | Mueller | C04B 35/44 |
| 9,506,626 B2 * | 11/2016 | Hagemann | C09K 11/7774 |
| 9,738,828 B2 * | 8/2017 | Hagemann | C09K 11/7774 |
| 2006/0054910 A1 | 3/2006 | Takemori | |
| 2010/0144079 A1 | 6/2010 | Mayer et al. | |
| 2010/0295438 A1 | 11/2010 | Ott et al. | |
| 2011/0210369 A1 | 9/2011 | Daicho et al. | |
| 2012/0057364 A1 | 3/2012 | Kishimoto et al. | |
| 2012/0230007 A1 | 9/2012 | Kawakami | |
| 2012/0313122 A1 | 12/2012 | Nakayama | |
| 2013/0099264 A1 | 4/2013 | Zimmerman et al. | |
| 2013/0107573 A1 | 5/2013 | Kadomi et al. | |
| 2016/0053950 A1 * | 2/2016 | Li | F21K 9/64 362/84 |
| 2016/0123557 A1 * | 5/2016 | Xu | C09K 11/02 362/84 |
| 2016/0245494 A1 * | 8/2016 | Weber | C04B 37/026 |

FOREIGN PATENT DOCUMENTS

| | | |
|---|---|---|
| DE | 102008012316 A1 | 4/2009 |
| EP | 2346101 A1 | 7/2011 |
| JP | 2006086176 | 3/2006 |
| JP | 2009267040 | 11/2009 |
| JP | 2012109314 | 6/2012 |
| JP | 2012185980 A | 9/2012 |
| JP | 2012190628 | 10/2012 |
| JP | 2012222011 | 11/2012 |
| WO | 2006115976 A1 | 11/2006 |
| WO | 2009115976 A | 9/2009 |
| WO | 2011104963 | 9/2011 |

OTHER PUBLICATIONS

English translation of International Preliminary Report on Patentability for corresponding International Application No. PCT/EP2014/065680 dated Feb. 18, 2016, 6 pages.

* cited by examiner

13

13

CONVERTER-COOLING ELEMENT ASSEMBLY WITH METALLIC SOLDER CONNECTION

CROSS REFERENCE TO RELATED APPLICATIONS

This application is a continuation of International Application No. PCT/EP2014/065680 filed on Jul. 22, 2014, which claims the benefit under 35 U.S.C. § 119(a) of German Patent Application No. 102013013296.6 filed Aug. 12, 2013, the entire contents of both of which are incorporated herein by reference

BACKGROUND OF THE INVENTION

1. Field of the Invention

The invention generally relates to a converter-cooling element assembly, also referred to as converter-cooling element assembly below, and to a method for producing a converter-cooling element assembly. More particularly, the invention relates to a ceramic converter, which is joined to a cooling element by a metallic connection.

2. Description of Related Art

Fluorescence converters, commonly also referred to as converters, are employed for converting light (or electromagnetic radiation) of a first wavelength into light of a second wavelength.

To this end, the converter is excited by a primary radiation light source with a first wavelength. The light from the primary radiation light source is converted by the converter, at least partially, into a secondary radiation having a second wavelength. A portion of the introduced light energy is converted into heat within the converter. It has to be removed from the converter as efficiently as possible to prevent an excessive temperature increase in the converter which might otherwise lead to a destruction of the converter material, depending on the converter material used. Moreover, even in converters that have a comparatively high thermal destruction threshold, conversion efficiency decreases as the temperature increases. This effect is caused by so-called "thermal quenching".

In order to minimize or avoid the adverse effects described above, devices for light conversion usually include a cooling element, for example in the form of a heat sink, by means of which the heat can be dissipated from the converter material. Decisive factors for efficient heat dissipation from the converter are in particular the thermal conductivity of the converter material and thermal conductivity of the connection between converter and cooling element.

WO 2009/115976 A1 describes a device for light conversion in which the converter is divided into individual sections. By dividing the converter material into smaller individual sections, rapid heat dissipation from the converter via the heat dissipating element to the heat sink is intended to be ensured. These individual converter sections are in contact with a thermally conductive and reflective material.

One option for thermal connection of converters to cooling elements described in the prior art comprises the use of an adhesive, for example an epoxy- or silicone-based glue.

For example, US 2012/0057364 A1 describes thermal connection of a converter by means of an adhesive which contains thermally conductive fillers.

However, the adhesive layer significantly contributes to the thermal resistance of the overall system thereby limiting the allowable power of the excitation light and hence also the light flux and luminance that can be achieved. Moreover, the glue connection is usually a limiting factor for the lifetime of the overall system.

Furthermore, the connection between converter and cooling element has to meet optical requirements, in particular sufficiently high reflection. The secondary light in the converter is emitted isotropically at any location, so that for example in a remission configuration light components of the secondary light will not be emitted in the useful direction but towards the cooling element. In order for these light components to be useful as well, they should be reflected by the cooling element.

This is achieved by employing a mirror in the prior art. This mirror is usually applied to the cooling element by means of a thin adhesive layer (e.g. based on a silicone or epoxy glue).

SUMMARY

Therefore, it is an object of the invention to provide a converter-cooling element assembly in which the cooling element and the converter are connected to each other so that the connection between converter and cooling element exhibits high reflectance, and so that both the connection between the converter and cooling element and the overall system exhibits low thermal resistance and good lifetime prediction. Another object of the invention is to provide a method for producing a such a converter-cooling element composite.

The converter-cooling element composite of the invention comprises a ceramic converter, a metal-containing coating and a metallic cooling element. The surface of the ceramic converter is directly coated with the metal-containing coating, at least partially, and the cooling element is connected with the metal-containing coating via a metallic solder connection.

The ceramic converter at least partially converts light having a first wavelength into light having a second wavelength. The use of a ceramic converter is particularly advantageous, since besides high temperature stability ceramic converters are moreover distinguished by good thermal conductivity. The high thermal conductivity promotes heat dissipation within the converter towards the cooling element. Thus, it is even possible to employ assemblies with comparatively thick converters, for example. According to one embodiment, the converter has a thickness from 50 μm to 500 μm, preferably from 150 μm to 250 μm. As a matter of fact, here, with decreasing thickness of the converter the influence of thermal conductivity of the metallic coating and of the connection to the cooling element is increasing, because in this case the thermal resistance of the converter is of lesser importance.

The surface of the ceramic converter is at least partly directly coated with a metallic coating. The metallic coating preferably contains at least one metal selected from the group comprising elements silver, gold, and platinum, and it is reflective.

According to one embodiment, the metallic coating exhibits a reflectance of at least 50%, preferably at least 60%, and more preferably at least 75% of the reflectance of a mirror from ALANOD company.

Due to the sometimes low transparency of ceramic converters, the metal-containing coatings of the invention were not applied to the ceramic converter substrate for determining the reflectance thereof, but to a transparent glass ceramic substrate (CLEARTRANS), and were then analyzed for their reflection properties through the converter substrate.

For this purpose, remission of the samples was measured in a Lambda 950 spectrophotometer with an integration sphere. For reference measurements, a sample in which a highly reflective mirror of ALANOD company was placed behind an unprinted CLEARTRANS substrate was measured as a 100% reference ($\text{Ref}_{HR}$) on the one hand, and on the other a blank unprinted CLEARTRANS substrate as a zero reference ($\text{Ref}_{OR}$).

The spectra were normalized for each wavelength according to the rule $$R_{normalized} = \frac{R(\text{measurement sample}) - R(\text{Ref}_{OR})}{R(\text{Ref}_{HR}) - R(\text{Ref}_{OR})}$$

Since the reference mirror from ALANOD company has a reflectance of 98%, this normalized reflectance is nearly equal to absolute reflectance.

Another option for evaluating reflectance is to analyze the shift of the chromaticity coordinate, also referred to as color coordinate or color location, that is caused by the reflector, if the converter spectrum still includes components of the excitation light. If the converter is irradiated with light having a first wavelength (e.g. blue light), this light is partially absorbed and converted into secondary light of a second, longer wavelength (e.g. into yellow light). This light is emitted isotropically within the converter. Since the converter does not or hardly absorb the secondary radiation, a significant part thereof reaches the back side of the converter. If a reflector is provided there, this light will be directed back towards the emission direction and, possibly after several scattering and reflection events, contributes to the useful luminous flux which has certain chromaticity coordinates. If this back side reflector has a reflectance of less than 100% or is not provided at all, the proportion of the secondary light in the useful light will be reduced. Thus, for the example mentioned above the yellow light component in the useful light would be reduced and the chromaticity coordinate would shift towards blue light. Therefore, the shift of chromaticity coordinates in the color space chromaticity diagram is a quality measure of the reflector.

The quality of reflection may thus be determined by the figure of merit $\text{FOM}_{CIE-cx}$, which is defined as $$\text{FOM}_{CIE-cx} = \frac{c_x(\text{measured sample}) - c_x(\text{Ref}_{OR})}{c_x(\text{Ref}_{HR}) - c_x(\text{Ref}_{OR})}.$$

The value $c_x$(measured sample) is the chromaticity coordinate of the converter provided with the silver-containing coating as determined in remission for the CIE 1931 standard color system. $c_x(\text{Ref}_{HR})$ is the chromaticity coordinate of the converter as determined while arranged or applied on an ALANOD mirror of 98% reflectance. $c_x(\text{Ref}_{OR})$ is the chromaticity coordinate of the converter, determined while lying on a dark background or a light trap.

According to one embodiment of the invention, $\text{FOM}_{CIE-cx}$ is greater than 40% and in particular greater than 60%.

As an alternative, it is possible to directly use the secondary luminous flux for evaluation. This is in particular appropriate for converters in which the excitation light is almost completely absorbed and converted, and whose chromaticity coordinate is therefore almost identical to the chromaticity coordinate of the pure emission spectrum. In this case, the evaluation by the chromaticity coordinate shift and $\text{FOM}_{CIE-cx}$, which is very simple in terms of measuring technique, is no longer possible because of the almost non-existent chromaticity coordinate shift.

Thus, the quality of reflection may alternatively be determined by the figure of merit $$\text{FOM}_{secondary\ luminous\ flux} = \frac{\text{luminous flux}_{sec.}(\text{measured sample}) - \text{luminous flux}_{sec.}(\text{Ref}_{OR})}{\text{luminous flux}_{sec.}(\text{Ref}_{HR}) - \text{luminous flux}_{sec.}(\text{Ref}_{OR})}$$

The secondary luminous flux is determined by spectrally filtering out the possibly remaining excitation light from the total luminous flux emitted from the converter to the measuring device.

For all individual measurements to be performed for measuring $\text{FOM}_{secondary\ luminous\ flux}$, the irradiation of the converter with the excitation light and in particular the power thereof has to be equal.

Luminous flux$_{sec.}$(measured sample) is the secondary luminous flux of the converter provided with the silver-containing coating. Luminous flux$_{sec.}$ ($\text{Ref}_{HR}$) is the secondary luminous flux of the converter while arranged or applied on a highly reflective reference mirror, e.g. an ALANOD mirror that has a reflectance of 98%.

Luminous flux$_{sec.}$($\text{Ref}_{OR}$) is the secondary luminous flux determined from the converter while lying on a dark background or a light trap.

According to one embodiment, the quality measure or figure of merit $\text{FOM}_{secondary\ luminous\ flux}$ of the metallic coating is greater than 40% and in particular greater than 60%.

According to the invention, portions of the metal-containing coating are connected to the cooling element via a metallic solder connection. Thus, the converter-cooling element assembly of the invention comprises a connection of the converter to the cooling element via a metallic connection. Because of the metals used according to the invention, there is a connection existing between the converter and the cooling element, which has a low thermal resistance.

This provides for a high thermal heat transfer coefficient HTC of the converter-cooling element assembly. Because of the good thermal conductivity of the metallic coating and of the solder connection, this value is in particular caused by the heat transfer coefficient of the ceramic converter and therefore strongly depends on the thickness thereof.

Thermal heat transfer coefficient HTC is derived as follows:

Thermal resistance $R_{th}$ is the quotient of the temperature difference between heat source and cooling element and the thermal flux flowing from the heat source to the cooling element:

$$R_{th} = \frac{\Delta T}{\dot{Q}}$$

For a homogeneous body of thickness d and cross-sectional area A, which is traversed by a uniform thermal flux Q across surface A, the following relationship applies for thermal conductivity $\lambda$ of the material $$R_{th} = \frac{d}{\lambda A}$$

Thus, thermal resistance decreases in proportion to the area that is available for the passage of heat, and increases in proportion to the thickness of the contact area. In addition, thermal resistances of the interfaces have to be taken into account.

In order to specify an area-independent parameter, heat transfer coefficient HTC is defined, in which heat passage and heat transfer at the interface are subsumed.

$$HTC = \frac{\dot{Q}}{A\Delta T} = \frac{\dot{q}}{\Delta T}$$

Like above, for a homogeneous body of thickness d, which is traversed by a homogeneous thermal flux q, with $$\dot{q} = \frac{\dot{Q}}{A}$$

the following relationship applies:

$$HTC - \frac{1}{R_{th} * A} = \frac{\lambda}{d}.$$

With respect to a converter of 200 µm thickness, the converter-cooling element assembly according to one embodiment has a heat transfer coefficient HTC of at least 25,000 W/m²K. Converters with other thicknesses may also be used according to the invention.

Preferably, the heat transfer coefficient HTC (as measured in a reference system with a converter of 200 µm thickness) is in a range from 25,000 to 32,000 W/m²K.

This permits to realize high optical power densities. For example, with a HTC of 30,000 W/m²K and a maximum tolerable temperature difference of 120° C., the resultant maximum power that can be thermally dissipated is 3.6 W/mm². Since only about ⅓ of the optical power has to be dissipated thermally, optical power densities of up to 10 W/mm² can be realized in this example.

Furthermore, the metal-containing coating exhibits high reflectance, so that no additional mirror nor additional reflective elements will be needed.

With the inventive configuration of the converter-cooling element assembly, organic bonding agents such as epoxy- or silicone-based glue can be dispensed with. Therefore higher thermal conductivities and lifetimes can be achieved as compared to the prior art.

According to one embodiment, the metal-containing coating is a silver-containing coating. Due to its good heat conductivity and ease of processability, the use of a silver-containing coating is particularly advantageous. Moreover, a coating can be obtained in this way, which has a high reflectance and has no or only very limited effect on the chromaticity coordinates of the useful light. Preferably, the coating has a silver content of at least 90 wt %, more preferably at least 95 wt %, and most preferably of more than 98 wt %.

In a further embodiment, the layer thickness of the metal-containing coating ranges from 50 nm to 30 µm, preferably from 2 to 20 µm, and more preferably from 8 to 12 µm.

In particular, the metal-containing coating is a sintered coating.

In one embodiment of the invention, the metal-containing coating additionally contains glass. In particular, the glass transition temperature Tg of the glass that is used is in a range from 300 to 600° C., preferably in a range from 400 to 560° C. This ensures that during the metallization process comprising steps c) and e) (coating and sintering) the glass component melts. In this way, in particular the wetting of the converter surface can be improved at the respective interfaces to the metal-containing coating, as well as the formation of a substantially homogeneous silver layer by the sintering process. This in turn has a positive effect on the thermal and optical properties of the converter-cooling element assembly. The glass content is preferably from 0.2 to 5 wt %.

In addition, the use of a metal-containing coating which additionally comprises glass components provides the possibility to exploit optical reflection at the glass/converter interface and thus to increase reflectance of the metal-containing coating. The use of glasses with a refractive index $n_{D20}$ in a range from 1.4 to 2.0 has been found to be particularly advantageous here, more particularly the use of glasses having a refractive index $n_{D20}$ in a range from 1.4 to 1.6. These latter glasses exhibit a rather high refractive index difference to the converter, so that the contribution to reflectance can be increased.

Therefore, according to one refinement of this embodiment, the glass component of the metal-containing coating comprises a ZnO glass or a $SO_3$ glass or a silicate-based glass, since these glasses have both advantageous glass transition temperatures and suitable refractive indices.

PbO-rich glasses and $Bi_2O_3$-rich glasses may also be used.

A particularly preferred glass is silicate-based glass, in particular a glass with a $SiO_2$ content of more than 25 wt %. Such glasses are inert or at least substantially inert against redox reactions involving the metal, which might cause metallic precipitates, and this even under the conditions of the production process, for example during firing of the metal-containing coating, so that the glass in the metal-containing coating is highly transparent. This allows to exploit reflection at the glass/metal interface in an optimum manner. By varying the $SiO_2$ content, solderability of the glasses and hence of the metal-containing coating that includes an appropriate glass content can be adjusted. For example, the wetting of the solder decreases with increasing $SiO_2$ content.

According to a further embodiment, the solder connection between the metal-containing coating and the cooling element contains a proportion of a tin-containing lead-free solder. This ensures good thermal communication and a sufficiently stable physical connection of the metal-containing coating or the coated converter to the cooling element.

In one embodiment of the invention, the cooling element has a thermal conductivity of >300 W/mK. Preferably, the cooling element comprises copper or a copper-containing material. Thus, in addition to low thermal resistance the cooling element exhibits good solderability. According to one refinement, the cooling element is made of a assembly material comprising a copper-containing core and a coating applied thereto, in particular a "chemically gold-nickel" coating. Corrosion effects caused by environmental influences can be minimized with such a coating.

The thermal conductivity of the connection between the converter and the cooling element may furthermore be evaluated based on the shift of chromaticity coordinates as a function of irradiated power from the primary light source. In case of low thermal conductivity, the converter will heat up, already with relatively low irradiated power, to such an extent that conversion efficiency decreases, so that the intensity of the measured chromaticity coordinates decreases. However, if the overall system exhibits high thermal conductivity and low thermal resistance, the intensity of the measured chromaticity coordinates will largely remain constant. Thus, the quality of heat conduction may also be defined by the figure of merit $$FOM_{therm.conductivity} = c_{y1} - c_{y2},$$

wherein $c_{y1}$ has been assumed as the chromaticity coordinate of the converter-cooling element assembly according to the invention determined at an irradiated power $P_1$, and $c_{y2}$ has been assumed as the chromaticity coordinate of the converter-cooling element assembly determined at a power $P_2$, given that $P_1 \ll P_2$ applies for the irradiated powers $P_1$ and $P_2$. $P_2$ is the power used during operation of the converter unit, $P_1$ is a power lower than $P_2$ by a factor of at least 7, at which there is yet no appreciable thermal quenching occurring.

Preferably, $FOM_{therm.conductivity}$ takes a value of not more than 0.04, most preferably not more than 0.02.

The cooling element may be connected to a heat sink or may be configured as a heat sink.

The converter-cooling element assembly may be operated both in transmission and in remission. In embodiments in which the converter is operated in transmission, the metal-containing coating on the converter is configured laterally, i.e. only portions of the converter surface are provided with the metal-containing coating. In particular the surfaces of the converter which are located in the beam path of the primary light source have no metal-containing coating.

In another embodiment, the converter-cooling element assembly is operated in remission. In this case, the metal-containing coating is in particular provided only on the surface(s) of the converter facing away from the primary light source, so that the light is reflected.

In another embodiment, the lateral surfaces of the converter are also provided with the metallic reflector, so that on the one hand, light impinging on the lateral surfaces is reflected back into the converter, and on the other hand, the heat that is produced can be dissipated via the lateral surfaces as well.

According to one embodiment, the converter-cooling element assembly, with a given square converter area of 5.2 mm×5.2 mm, a converter thickness of 200 μm, and uniform heat input across this surface, exhibits a thermal resistance of less than 3 K/W, preferably less than 2 K/W, and most preferably less than 1.5 K/W.

Furthermore, the invention relates to a method for producing a assembly, or assembly, that comprises a ceramic converter, a metal-containing reflective coating for heat dissipation, and as a further means for heat dissipation a cooling element connected to the metal-containing coating via a metallic solder connection. The method according to the invention comprises at least method steps a) to f).

First, in step a), a ceramic converter with at least one polished surface is provided. In addition to allowing the use of primary light sources of high luminance (e.g. semiconductor lasers), the high temperature stability of the ceramic converter material moreover allows for high process temperatures in the subsequent method steps.

Step b) comprises providing a metal-containing paste. The metal-containing paste includes a metal powder in an organic pasting medium. In particular, the organic pasting medium used is a rheological additive which is a solution of resins and organic additives in a solvent mixture and/or which is dryable by IR (e.g. Johnson Matthey 650-63 IR Medium Oil-based, OKUNO 5000). The pasting medium serves to adjust the rheology of the paste so that the paste can be printed, for example.

The metal powder preferably contains at least one metal selected from the group comprising elements silver, gold, and platinum, and alloys thereof. In particular silver powder is used which is particularly advantageous since silver exhibits both, high thermal conductivity and high reflectivity.

According to one embodiment, the metal paste provided in step b) contains a silver content from 70 to 90 wt %, preferably from 80 to 85 wt %. The proportion of organic pasting medium is from 10 to 30 wt %, preferably from 15 to 20 wt %.

Subsequently, the paste obtained in step b) is applied to at least a portion of the polished converter surface (step c). Preferably, the paste is applied to the converter surface by a printing process, in particular by a screen printing process. This makes it possible to surprisingly easily produce a lateral configuration of the coating on the converter surface. It is possible in this manner to print only portions of the converter surface, or to leave them blank. Other printing methods such as pad printing or roll printing processes are also possible.

In step d), the paste applied to the converter surface is dried. Preferably, the paste is dried at temperatures ranging from 150 to 400° C., more preferably at temperatures in a range from 250 to 300° C. In this way, the solvents contained in the pasting medium are at least partially removed, and in particular the applied paste is pre-densified. Drying duration depends on the solvent content in the applied paste and is typically between 5 and 30 minutes.

In the subsequent step e), the applied paste is fired, or baked, at temperatures of more than 450° C., which leads to a good thermal and mechanical connection of the so formed coating to the converter. Moreover, the high firing temperatures cause sintering of the metal particles contained in the metal powder. The resulting sintered structure has a relatively high degree of homogeneity and leads to the good reflective properties of the so obtained coating. Here, firing temperatures in a range from 700° C. to 1000° C. have been found to be particularly advantageous.

According to one embodiment, the metal powder may largely or partially melt, depending on the firing temperature employed and the metal powder used, so that the ceramic converter is wetted by the metal at the interface. According to further embodiments, the metal particles contained in the paste merely sinter together.

During firing of the paste, the organic components of the applied paste or residuals of the pasting medium are burned off.

In step f), the so coated converter is connected to the cooling element by producing a solder connection. For this purpose, the cooling element is soldered to the coating obtained in step e) using a solder, preferably a tin-containing lead-free solder.

According to one refinement of the invention, the paste provided in step b) additionally includes a proportion of glass. The glass content leads to better adhesion of the coating on the converter surface and to improved sintering behavior of the metal particles to one another. Furthermore, the glass content has an effect on the solderability of the metallic coating.

According to an additional embodiment of the invention, the metallic reflector may be applied repeatedly. For this purpose, paste is applied again (step c), either after the drying of the paste (step d) or after the firing of the paste (step e), and processing continues as described.

In one embodiment, the glass content is from 0.05 to 8 wt %, preferably from 0.1 to 6 wt %, more preferably from 0.2 to 5 wt %. This glass content has proven to be advantageous because on the one hand the amount of glass is sufficient to increase adhesion of the coating on the surface of the converter, and on the other hand good solderability of the coating is still ensured.

The use of glass powders with a particle size D50 in a range from 1 to 5 μm has been found to be advantageous in this case. This ensures homogeneous distribution of the glass particles in the paste and therefore also homogeneous distribution of the glass content in the coating obtained in step e).

According to one embodiment, the glass contained in the paste has a glass transition temperature Tg in a range from 300 to 600° C., preferably in a range from 350 to 560° C.

Preferably, the glass powder used in step b) is a glass selected from a group comprising PbO glass, $Bi_2O_3$ glass, ZnO glass, $SO_3$ glass, and silicate-based glass. These glasses have proven to be particularly advantageous with regard to their softening points and/or their refractive indices.

According to a particularly preferred embodiment, a silicate-based glass is used in step b), in particular a glass having a $SiO_2$ content of at least 25 wt %.

Besides advantageous refractive indices and softening points, such glasses moreover exhibit a high resistance to redox processes involving the metal and/or the ceramic converter, under the firing conditions according to the invention (step e)).

The inventive converter-cooling element assembly may in particular be used for laser headlights and spotlights, in particular spotlights for stage lighting. Another application field are projectors, including projectors that project images in alternating directions (spinning projectors) as well as projectors that project images in only one direction (static projectors). Furthermore, the converter-cooling element assembly can be used for light sources in optical measurement technology.

BRIEF DESCRIPTION OF THE DRAWINGS

The invention will now be described by way of exemplary embodiments and with reference to FIGS. 1 through 14, wherein.

DETAILED DESCRIPTION OF THE INVENTION

Figure 1:
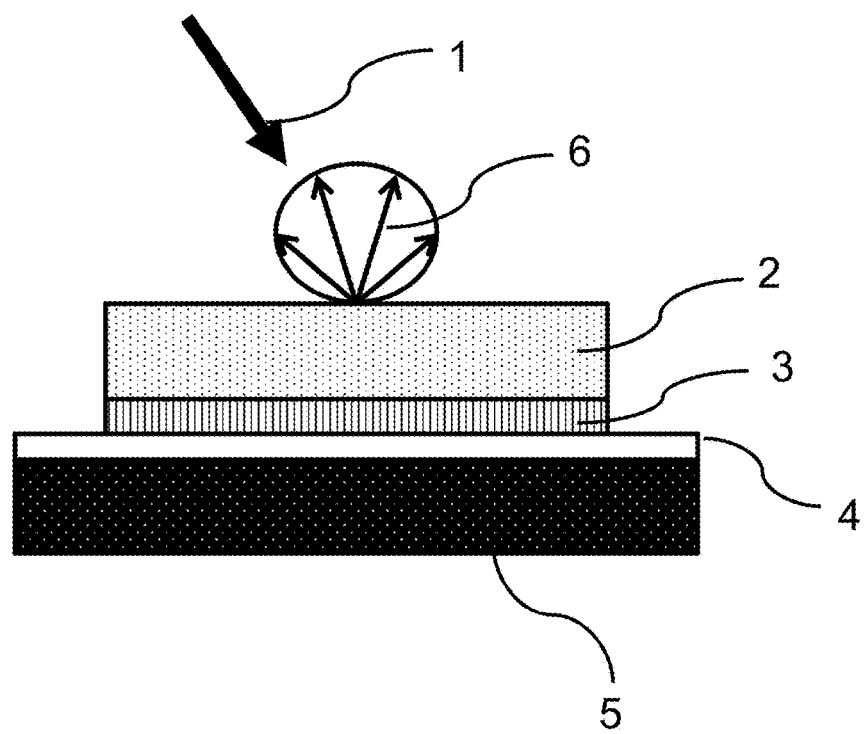
FIG. 1 is a schematic view of a glued converter-cooling element assembly in a remission arrangement.

FIG. 1 schematically shows a converter-cooling element assembly known from prior art, in a remission arrangement. In this case, the converter 2 is applied on a mirror 4 with the opposite side or side facing away from the primary light source 1, by means of a glue layer 3, and the mirror is connected to a cooling element 5. Mirror 4 ensures that the secondary light 6 produced within the converter 2 and non-absorbed portions of the primary light 1 are reflected.

Figure 2:
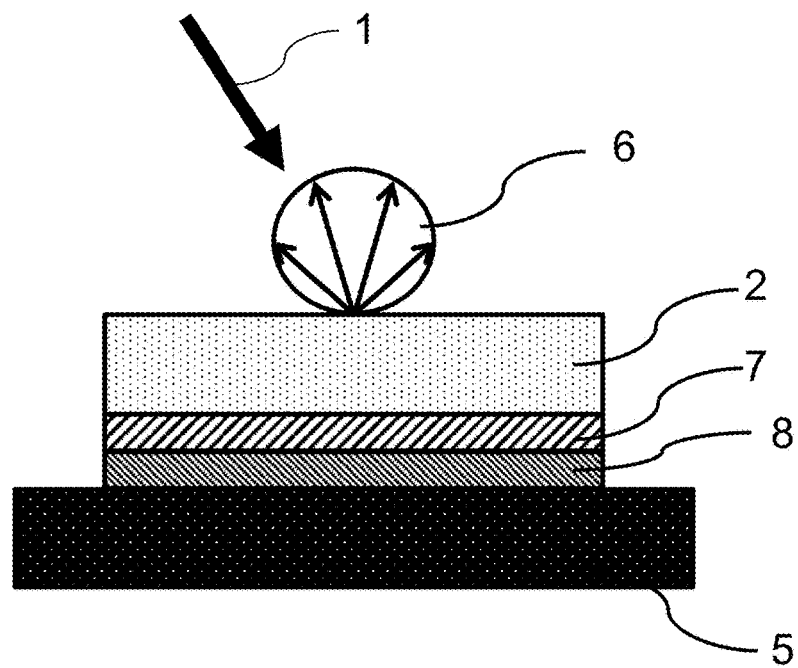
FIG. 2 is a schematic view of a first embodiment of the converter-cooling element assembly according to the invention in a remission arrangement.

FIG. 2 schematically illustrates an embodiment of the converter-cooling element assembly, also referred to as converter-cooling element assembly below, according to the invention, in a remission arrangement. Here, the converter 2 is provided with a metal-containing coating 7 on the surface facing away from primary light source 1. Metal-containing coating 7 and cooling element 5 are connected to each other via a solder connection 8. Metal-containing coating 7 is reflective and therefore replaces the mirror 4 shown in FIG. 1.

Figure 3:
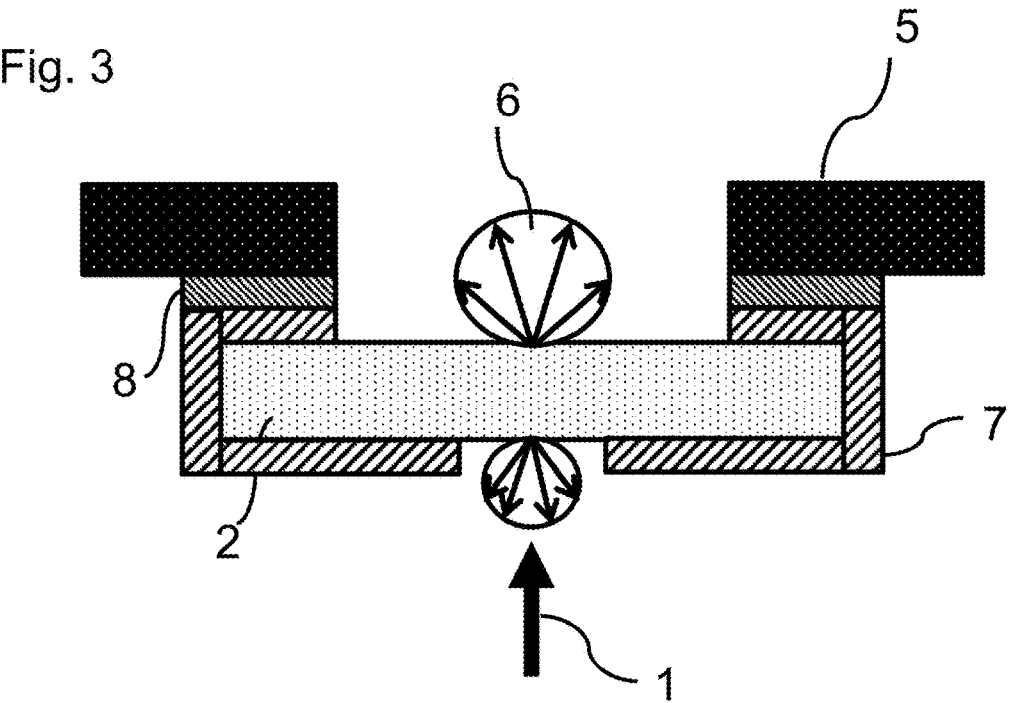
FIG. 3 is a schematic view of a second embodiment of the converter-cooling element assembly according to the invention in a transmission arrangement.
Figure 4:
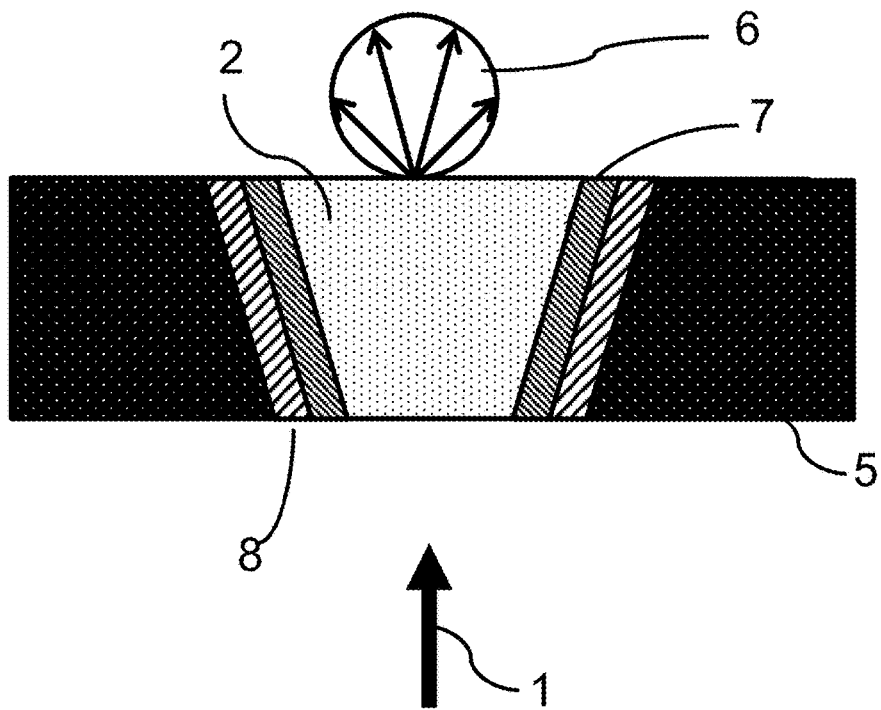
FIG. 4 is a schematic view of a third embodiment of the converter-cooling element assembly according to the invention in a transmission arrangement.

FIGS. 3 and 4 show the structure of two embodiments of the converter-cooling element assembly according to the invention in transmission arrangements. In this case, the metal-containing coating 7 on the converter surface is configured laterally, in particular the metal-containing coating 7 is not applied in the beam path.

In the embodiment shown in FIG. 3, the metal-containing coating 7 applied on converter 2 has portions, which are not connected to the cooling element 5 via a solder connection 8, for example on the side of the converter, which faces the primary light source. In this case, the metal-containing coating 7 prevents secondary radiation 6 from being emitted from the lateral surfaces of the converter 2 by reflecting the radiation. In addition, the lateral configuration of the metal-containing coating 7 as shown in FIG. 3 achieves high and uniform heat dissipation.

FIG. 4 schematically illustrates an embodiment in a transmission arrangement, in which the converter 2 is cone-shaped. The lateral surfaces of the cone are provided with the metal-containing coating, which in turn is connected to the cooling element via solder connection 8.

Figure 5A:
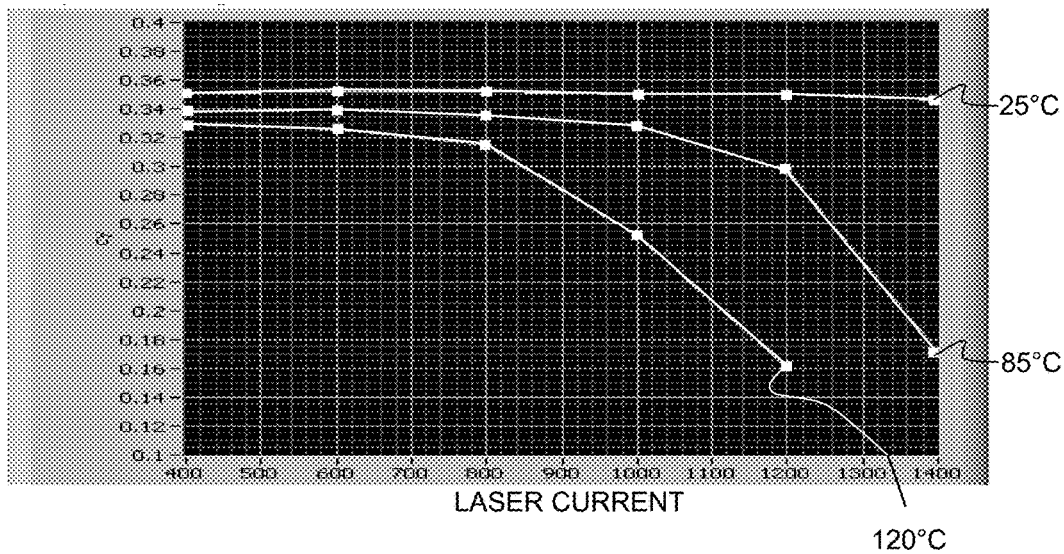
FIG. 5a shows a graphical comparison of temperature stability and power stability of a glued converter-cooling element assembly.
Figure 5B:
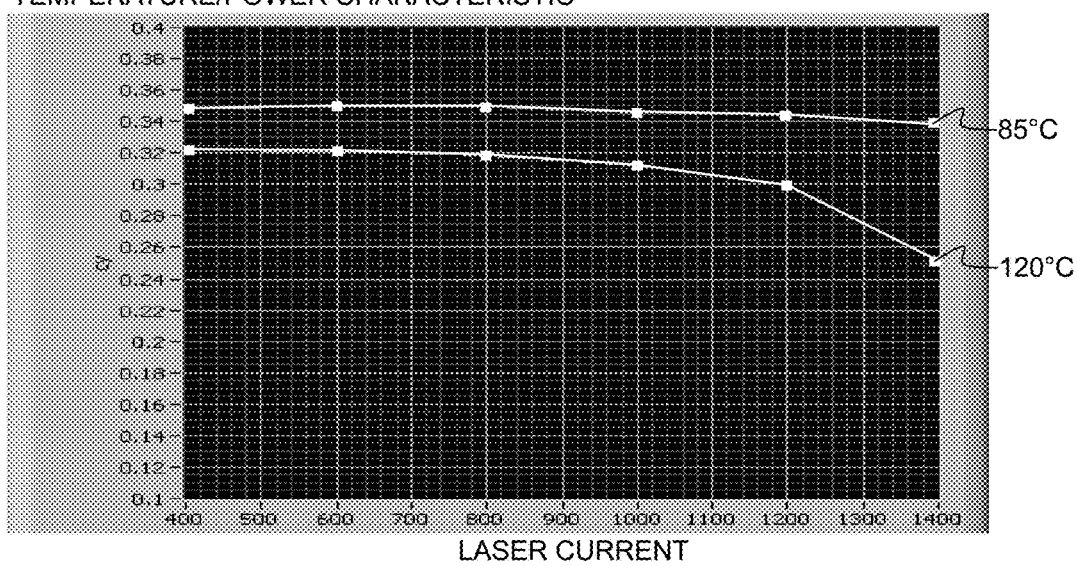
FIG. 5b shows a graphical comparison of temperature stability and power stability of a converter-cooling element assembly according to the invention.

FIGS. 5a and 5b illustrate the shift of the chromaticity coordinate of the converter as a function of irradiated laser power for different temperatures. FIG. 5a shows the temperature/power characteristic of a conventional converter-cooling element assembly as illustrated in FIG. 1. FIG. 5b shows the temperature/power characteristic of an embodiment of the converter-cooling element assembly according to the invention as shown in FIG. 2. In each case, the employed converters have the same composition and thickness.

The shift of the chromaticity coordinate as a function of the laser power irradiated onto a small excitation spot can be used to evaluate thermal conductivity. In case of low thermal conductivity, the converter will heat up already at relatively low irradiated laser power to such an extent that conversion efficiency decreases and that the measured chromaticity coordinate decreases. In case of improved thermal conductivity, the chromaticity coordinate will remain at a high level, even for higher laser powers.

This difference can be seen in FIGS. 5a and 5b illustrating a comparison of a glued converter (on a mirror which in turn is connected to the cooling element by means of thermal grease) with the soldered embodiment according to the invention: when comparing the behavior at the same temperature of the cooling element (85° C. or 120° C.), the drop of the color coordinate (and hence of conversion efficiency) of the embodiment according to the invention only occurs at significantly higher laser powers than with the glued variant. At a temperature of the cooling element of 85° C., a shift of the color coordinate Dcy of more than 0.02 occurs at a laser current of about 1000 mA in case of the glued variant, while with the inventive solution the shift of color coordinate Dcy is still less than 0.02 even with the maximum feasible laser current of 1400 mA. At a temperature of the cooling element of 120° C., a shift of the color coordinate Dcy of more than 0.02 is already resulting at a laser current of approximately 820 mA for the glued variant, while for the embodiment according to the invention this is only the case at 1200 mA.

Table 1 shows an approximation of the thermal resistance of a conventional converter-cooling element assembly according to FIG. 1 and of an embodiment of the converter-cooling element assembly according to the invention according to FIG. 2, with homogeneous heat input.

TABLE 1

Approximation of thermal resistance for a prior art converter assembly and for the solution according to the invention

| Component | Thermal resistance R_th = 1/(λ * A) [K/W] | Thermal conductivity λ [W/mK] | Cross-sectional area A [mm²] | Thickness I [µm] |
|---|---|---|---|---|
| Prior Art | | | | |
| Converter (d = 200 mm) | 3.33333 | 6 | 10 | 200 |

TABLE 1-continued

Approximation of thermal resistance for a prior art converter assembly and for the solution according to the invention

| Component | Thermal resistance R_th = 1/(λ * A) [K/W] | Thermal conductivity λ [W/mK] | Cross-sectional area A [mm²] | Thickness I [µm] |
|---|---|---|---|---|
| Glue connection (d = 10 µm) | 3.33333 | 0.3 | 10 | 10 |
| Heat sink (d = 1 mm) | 0.00033 | 300 | 10 | 1 |
| Entire assembly | 6.7 | | | |
| Metallic connection | | | | |
| Converter (d = 200 mm) | 3.33333 | 6 | 10 | 200 |
| Metallization (d = 10 µm) | 0.02500 | 40 | 10 | 10 |
| Solder connection (d = 100 µm) | 0.01667 | 60 | 10 | 10 |
| Heat sink (d = 1 mm) | 0.00033 | 300 | 10 | 1 |
| Entire assembly | 3.4 | | | |

Figure 6A:
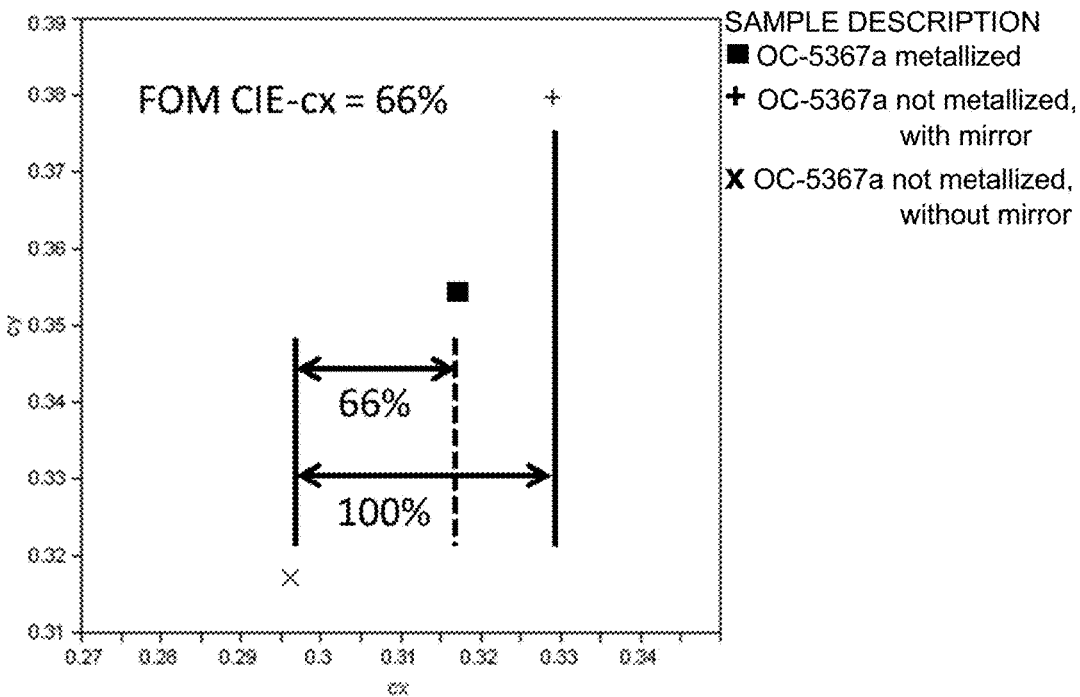
FIG. 6a show a graphical comparison of chromaticity coordinates of a converter coated according to the invention with similar non-coated converters with and without ALANOD mirror.
Figure 6B:
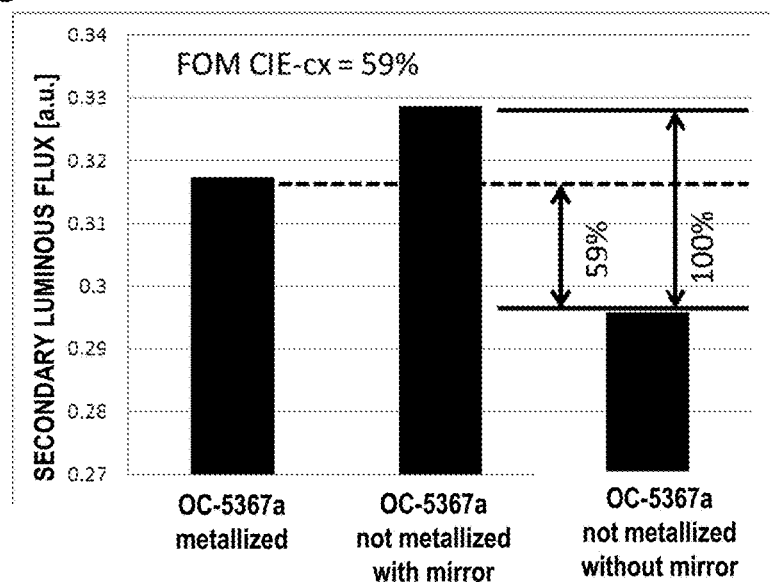
FIG. 6b show a graphical comparison of secondary luminous flux of a converter coated according to the invention with similar non-coated converters with and without ALANOD mirror.

FIG. 6 shows a comparison of chromaticity coordinates (FIG. 6a) and secondary luminous flux (FIG. 6b) of converter-cooling element assemblies with and without reflector and with metal-containing coating, respectively.

Evaluation of reflection properties of a paste reflector at the internal ceramic/reflector interface is not trivial, since the ceramic is a translucent medium having a high refractive index and a slightly porous surface. Thus, it cannot be assumed that the evaluation on a transparent substrate of a similar refractive index (e.g. sapphire or CLEARTRANS® glass ceramic) is representative.

FIG. 6a shows an evaluation on the basis of the shift of chromaticity coordinates caused by the reflector: when the converter is irradiated with blue light (e.g. wavelength of 450 nm), this light will be absorbed completely or partially and will be converted into yellow secondary light, for example. This light is emitted isotropically within the converter. Since the converter does not or hardly absorb the secondary radiation, a significant part thereof reaches the back side of the converter. If a reflector is provided there, this light will be directed back towards the emission direction and will, possibly after multiple scattering and reflection events, contribute to the useful luminous flux which has a certain color location. If this back side reflector has a reflectance of less than 100% or is not provided at all, the proportion of the yellow light in the useful light is reduced and the color location will shift towards the blue light. Therefore, the shift of color coordinates in the color space chromaticity diagram (e.g. CIE1931/2° observer) is a quality measure of the reflector. For reliable evaluation, the converter should have a sufficient thickness and should be sufficiently doped with fluorescent active sites so that all blue light is absorbed across the converter thickness. But even if the reflector still reflects components of the blue light, the shift of color coordinates is a suitable measure. The advantage of evaluation on the basis of color location shift is that the color location measured at low power is a measure that is independent of the excitation power and is easily accessible in terms of measurement technology. However, it is only suitable for converters that remit a sufficient proportion of the excitation light.

FIG. 6a shows the chromaticity coordinates of a converter of 200 µm thickness irradiated with blue laser light of 450 nm wavelength while lying on a very highly reflective metal mirror (ALANOD Miro Silver) on the one hand, and on a black pad on the other, measured in remission in each case. These chromaticity coordinates represent the reference chromaticity coordinates in the sense of $FOM_{CIE-cx}$ for the case of a highly reflective mirror and for the case that a mirror is not provided. The chromaticity coordinates measured on an identical converter that has a metallic coating are located between the two reference values. $FOM_{CIE-cx}$ as calculated from the chromaticity coordinate data is 66%.

Thus, the metal-containing coating exhibits significantly increased reflectivity when compared to the black background, but it is not as highly reflective as the ALANOD reference mirror. However, the converter-cooling element assembly has a substantially better thermal connection.

FIG. 6b shows an alternative possibility for evaluation of the metallic coating based on the luminous flux of the secondary light. In the example, the measurement was carried out with a luminance camera in which, by means of camera optics, a spectrophotometer captures the luminous flux emitted from a measured spot on the converter surface in a certain spatial angle. From the captured spectrum, the secondary light component and the excitation light are then separated by calculation, so that the input variables for calculating $FOM_{secondary\ luminous\ flux}$ can be determined. In the present example, $FOM_{secondary\ luminous\ flux}$ is 59%. When measuring the input variables, particular attention has to be paid to have the same excitation power. Furthermore, measurement setups are conceivable in which the separation of secondary light component and excitation light is accomplished by means of filters, or in which the luminous flux or part of the luminous flux is captured in other measurement configurations.

Figure 7A:
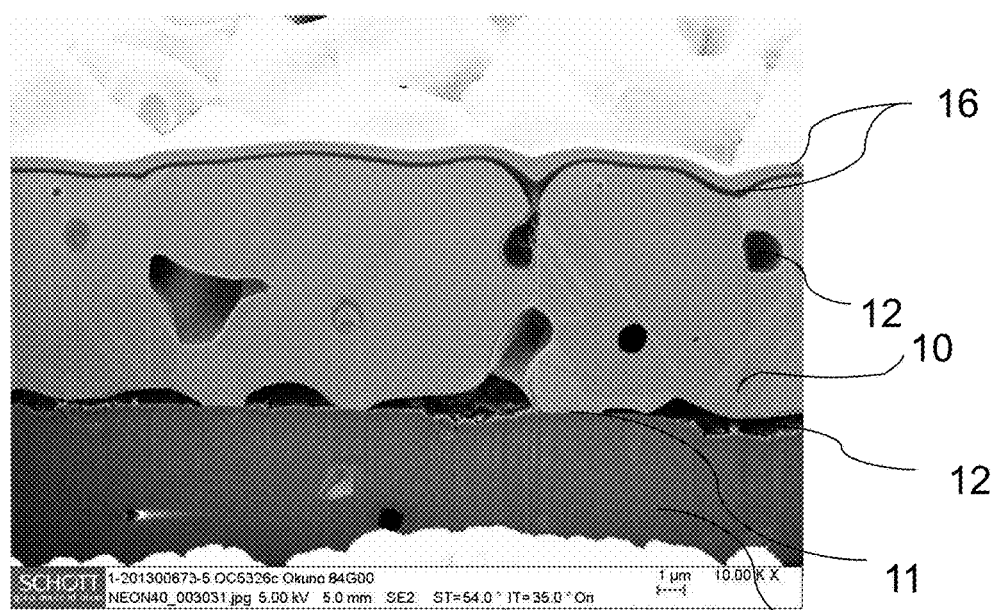
FIG. 7a is a cross-sectional SEM image of an embodiment of the invention having a first glass content of the metal-containing coating.
Figure 7B:
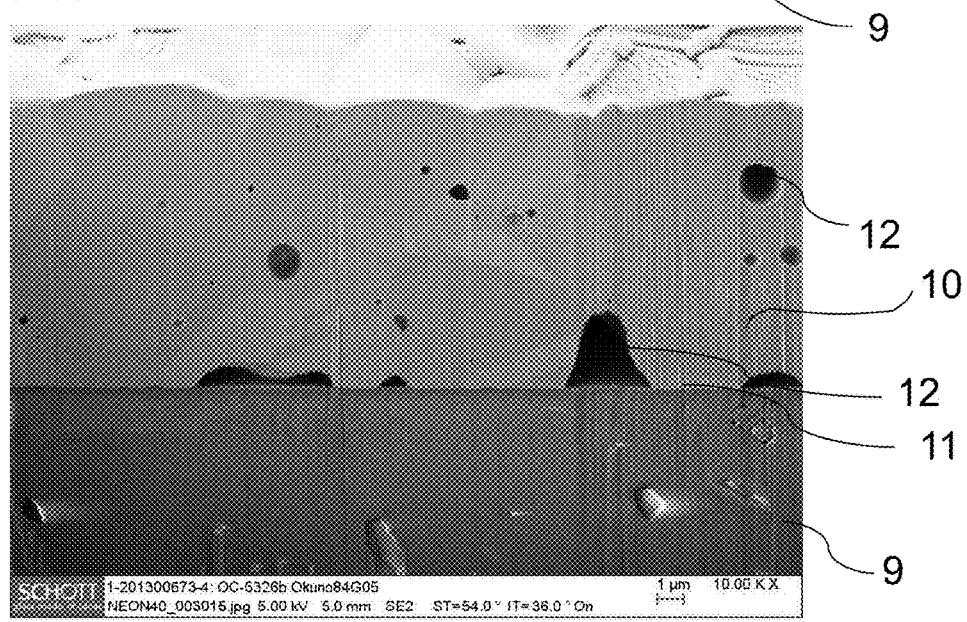
FIG. 7b is a cross-sectional SEM image of another embodiment of the invention having a second glass content of the metal-containing coating.

FIG. 7 shows cross-sectional SEM images (FIB sections) of ceramic converters 9 with sintered silver-containing coatings 10. The thickness of the coating 10 is 9 µm (FIG. 7a) and 11 µm (FIG. 7b), respectively. The coatings of FIGS. 7a and 7b differ in the glass content in the coating. Coating 10 as shown in FIG. 7a does not include glass, while the proportion of glass in the paste of FIG. 7b is 0.5 wt %. From the orientation contrast, the original grain structure of the paste can be recognized. The coating has a sintered structure, in which the metal particles that existed before firing were sintered together to a large extent so that the coating exhibits a relatively high degree of homogeneity. The cavities 12 or so-called voids, predominantly located at the interface 11 between silver-containing coating and ceramic converter are process-related.

In FIG. 7a, a $SiO_2$-tungsten layer 16 can be seen, which is applied prior to the cross section preparation by FIB in order to improve the quality of the cross-sectional image, but which is not part of the metallic reflector.

Figure 8A:
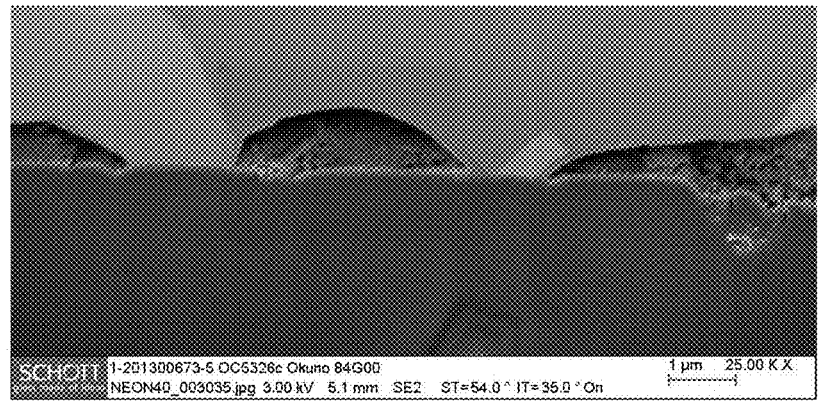
FIG. 8a is a cross-sectional SEM image of another embodiment of the invention having a third glass content of the metal-containing coating.
Figure 8B:
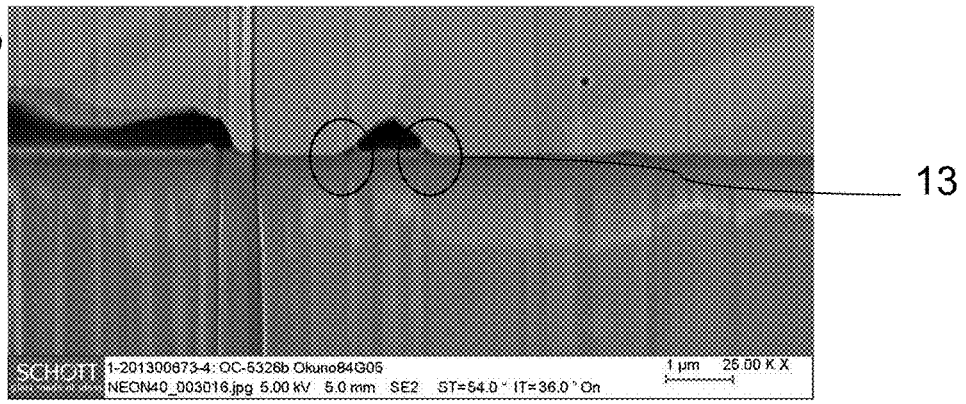
FIG. 8b is a cross-sectional SEM image of another embodiment of the invention having a fourth glass content of the metal-containing coating.
Figure 8C:
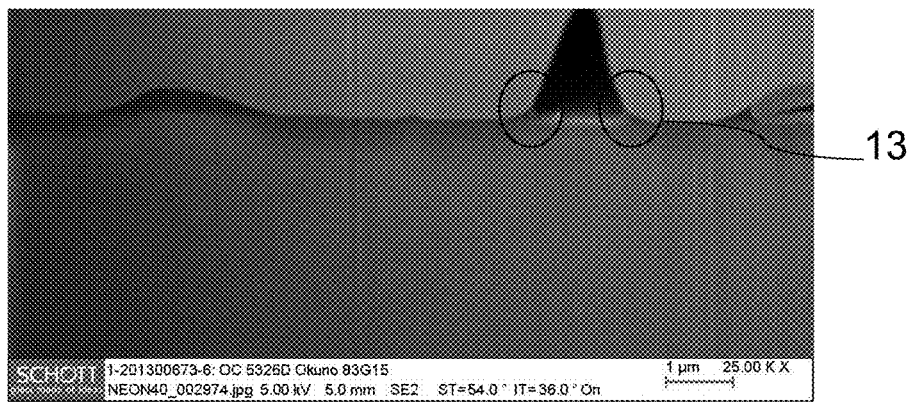
FIG. 8c is a cross-sectional SEM image of another embodiment of the invention having a fifth glass content of the metal-containing coating.

FIGS. 8a to 8c also show cross-sectional SEM images (FIB sections) of a ceramic converter 9 having a silver-containing coating 10, wherein the coatings in FIGS. 8a to 8c differ in the glass content of the coating. The coating 10 as shown in FIG. 8a does not include glass, while the glass content of the paste in FIGS. 8b and 8c is 0.5 wt % and 1.5 wt %, respectively.

The glass-containing coatings (FIG. 7b, 8b, 8c) exhibit a better surface contact at the interface between coating and converter surface than the glass-free coatings (FIGS. 7a and 8a). Thus, the glass content provides for improved adhesion of the coating to the converter surface. This is also apparent from glass gussets 13 which form in case of the glass-containing coatings. As a preparation artifact (due to cross section preparation by ion beam etching), an additional layer is deposited in the voids, which appears brighter than the glass due to material contrast (see, e.g. FIG. 8c on the right edge of the image where this layer is disposed on a glass gusset, or in FIG. 8a where a thin layer can be seen on the inner walls of the voids of the silver-containing layer).

Moreover, the glass content leads to better sintering of the metal particles to one another.

Figure 9:
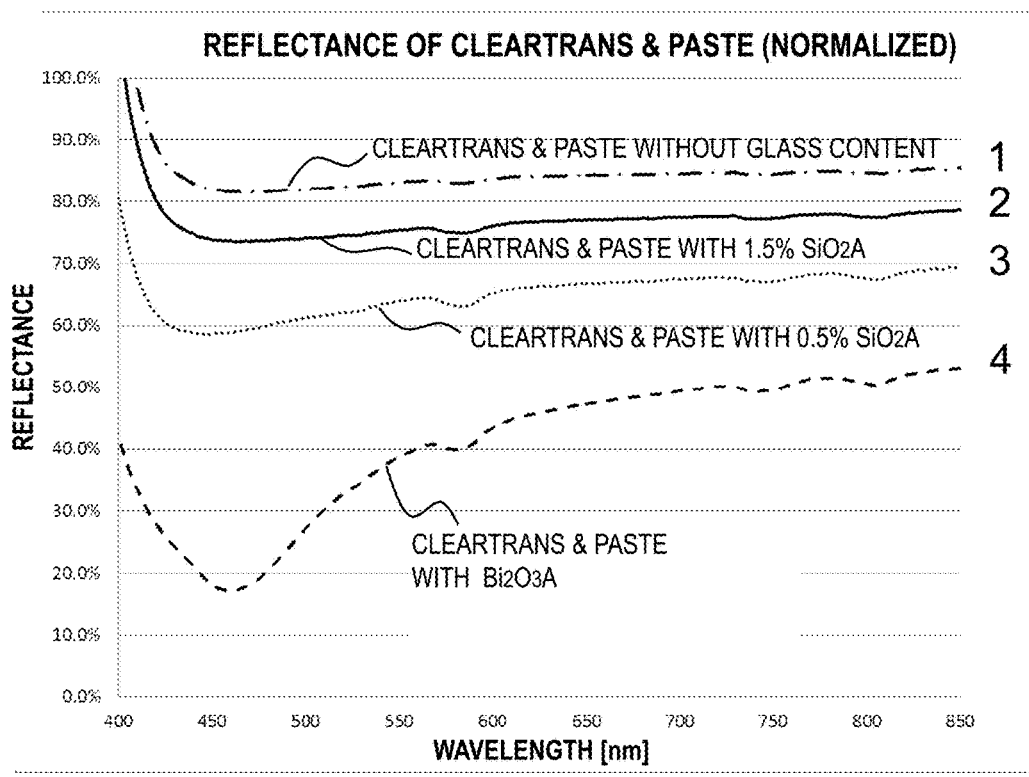
FIG. 9 shows graphs of reflectance measurements of different embodiments of the metal-containing coatings on transparent glass ceramic substrates.

FIG. 9 shows normalized reflectance spectra of different embodiments of the metal-containing coatings according to the invention on transparent glass ceramic substrates, and of corresponding reference samples.

Evaluation of the paste reflector on a ceramic converter is difficult, because the ceramic converter is not transparent. Therefore, different silver-containing coatings which differ with regard to their content of glass or the glass composition used, were applied onto a transparent glass ceramic substrate (CLEARTRANS) and were then examined for their reflection properties through the substrate. To this end, remission of the samples was measured in spectrophotometer Lambda 950. As reference measurements, a sample in which a highly reflective ALANOD silver mirror was placed behind a non-printed CLEARTRANS substrate was measured as a 100% reference ($Ref_{HR}$) on the one hand, and on the other a blank non-printed CLEARTRANS substrate as a zero reference ($Ref_{OR}$).

Normalization of the spectra was performed for each wavelength according to the rule $$R_{normalized} = \frac{R(\text{measurement sample}) - R(Ref_{OR})}{R(Ref_{HR}) - R(Ref_{OR})}.$$

The measurements show that with the employed exemplary embodiments reflectances of more than 83% (based on the reflection of a silver mirror) can be achieved. The reflectance values depend on the glass content and on the composition and hence the refractive index of the employed glass.

Exemplary embodiment 1 does not contain glass, while the coatings of exemplary embodiments 2 and 3 include 0.5 wt % and 1.5 wt % of a silicate glass, respectively, (based on the paste provided in step b), i.e. prior to firing). Exemplary embodiment 4 contains $Bi_2O_3$-based glass and exhibits a substantially lower reflectance, due to the refractive index of the glass and to possibly occurring redox reactions at the interface.

Figure 10:
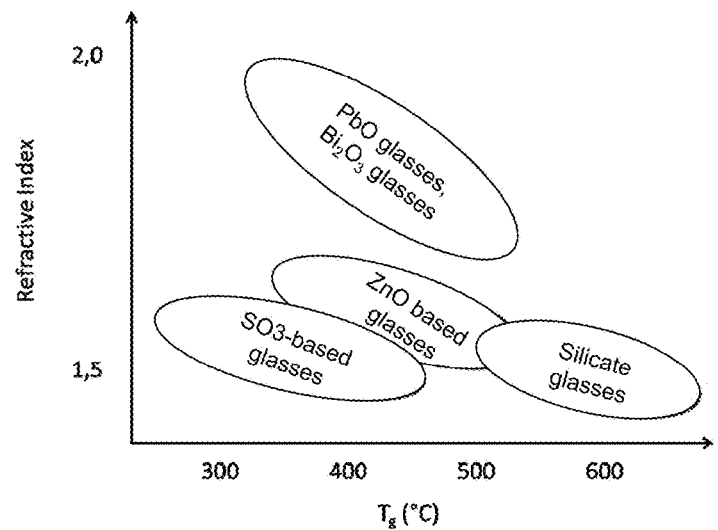
FIG. 10 is a graph showing the refractive indices and glass transition temperatures of various glasses.

FIG. 10 is a graph showing the relationship between refractive index and glass transition temperature of various types of glass used in the following exemplary embodiments.

Table 2 shows different exemplary embodiments A to I, which differ with regard to the employed type of glass and the glass content. The proportions by weight as indicated refer to the paste provided in step b). The rest of the composition which is not listed is the organic pasting medium.

TABLE 2

Details of exemplary embodiments, listing the glass powder component and composition of the paste

| No. | Glass component | Tg (° C.) | Glass content (wt %) | Silver content (wt %) |
|---|---|---|---|---|
| A | non | | 0 | 85% |
| B | SiO$_2$A SiO$_2$-rich | 549 | 0.2% | 85% |
| C | SiO$_2$A SiO$_2$-rich | 549 | 0.5% | 84% |
| D | SiO$_2$A SiO$_2$-rich | 549 | 1.5% | 82% |
| E | SiO$_2$B SiO$_2$-rich | 433 | 0.5% | 84% |
| F | Bi$_2$O$_3$A Bi$_2$O$_3$-rich | 365 | 5.0% | 84% |
| G | ZnOPA ZnO/P$_2$O$_5$-rich | 455 | 2.6% | 83% |
| H | ZnOBA ZnO:B$_2$O$_3$-rich | 476 | 1.9% | 83% |
| I | SO$_3$A SO$_3$-rich | 343 | 1.7% | 83% |

Below, the glass compositions of embodiments A to I are listed (in percent by weight):

SiO$_2$A, SiO$_2$-rich

| SiO$_2$ | 31.1 |
|---|---|
| Al$_2$O$_3$ | 8.8 |
| B$_2$O$_3$ | 23.0 |
| Na$_2$O | 8.2 |
| CaO | 17.6 |
| ZnO | 11.3 |

SiO$_2$B, SiO$_2$-rich

| SiO$_2$ | 56.01 |
|---|---|
| Al$_2$O$_3$ | 5.28 |
| B$_2$O$_3$ | 3.96 |
| Li$_2$O | 18.89 |
| BaO | 11.89 |
| ZnO | 3.96 |

Bi$_2$O$_3$A, BiO$_2$O$_3$-rich

| Bi$_2$O$_3$ | SiO$_2$ | Al$_2$O$_3$ | B$_2$O$_3$ | ZnO |
|---|---|---|---|---|
| 80.7 | 1.2 | 0.8 | 6.2 | 11.1 |

ZnOPA, ZnO/P$_2$O$_5$-rich

| P$_2$O$_5$ | 51.1 |
|---|---|
| Al$_2$O$_3$ | 1.9 |
| MgO | 1.8 |
| CaO | 2.5 |
| SrO | 4.7 |
| BaO | 13.8 |
| ZnO | 24.2 |

ZnOBA, ZnO:B$_2$O$_3$-rich

| SiO$_2$ | 7.0 |
|---|---|
| Al$_2$O$_3$ | 6.0 |
| B$_2$O$_3$ | 27.0 |
| Na$_2$O | 5.0 |
| K$_2$O | 1.0 |
| MnO$_2$ | 6.0 |
| ZnO | 48.0 |

SO$_3$A, SO$_3$-rich

| P$_2$O$_5$ | 33.45 |
|---|---|
| SO$_3$ | 15.08 |
| Na$_2$O | 14.6 |
| CaO | 3.3 |
| ZnO | 33.56 |

Figure 11:
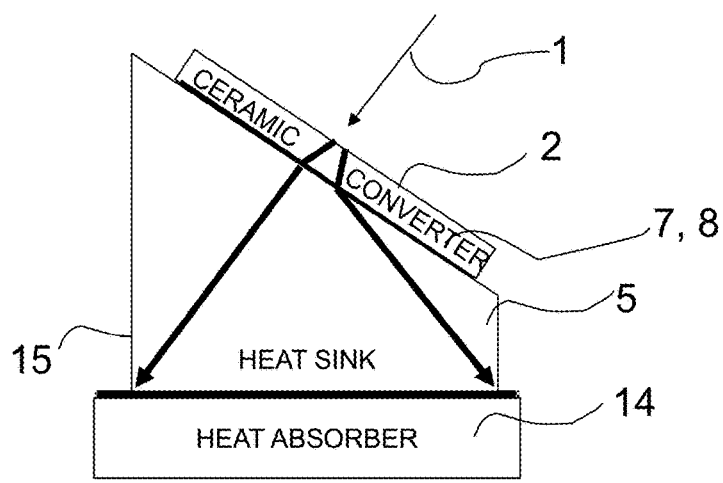
FIG. 11 schematically illustrates the experimental setup for determining the heat transfer coefficient HTC.

FIG. 11 schematically illustrates the structure of a complex converter-cooling element assembly with localized heat input 1 (e.g. via a laser spot) into the converter 2.

In this assembly, a converter of 200 μm thickness is coated with a metal-containing coating 7 on the surface facing away from the primary light source 1, and the metal-containing coating 7 is connected to a spatially limited cooling element 5 via a metallic solder connection 8 (not illustrated in FIG. 11). The cooling element 5 is connected to a heat sink 14. The thermal flux is represented by arrows 15.

Arrows 15 illustrate the expansion of thermal flux in the converter-cooling element assembly. Due to the use of a laser as the primary light source 1, heat input is locally limited by the beam spot (radius of about 200 μm). Expansion of thermal flux already occurs within the ceramic, so that thermal flux density is already decreased at the interface to the cooling element. In the cooling element, the thermal flux is further expanding so that the heat transfer coefficient (HTC) between the cooling element and the actual heat sink may then be acceptable even in case of a bad HTC of this connection, because of the large contact area.

Accordingly, the thermal resistance determined from such an assembly only represents a figure of merit for the real thermal performance of the overall assembly in case of localized heat input, which thermal resistance will strongly depend on the thickness of the converter and the geometry of the laser spot. However, the thermal resistance as determined from such an assembly is not suitable to evaluate a converter-cooling element assembly independently of its application.

Figure 12:
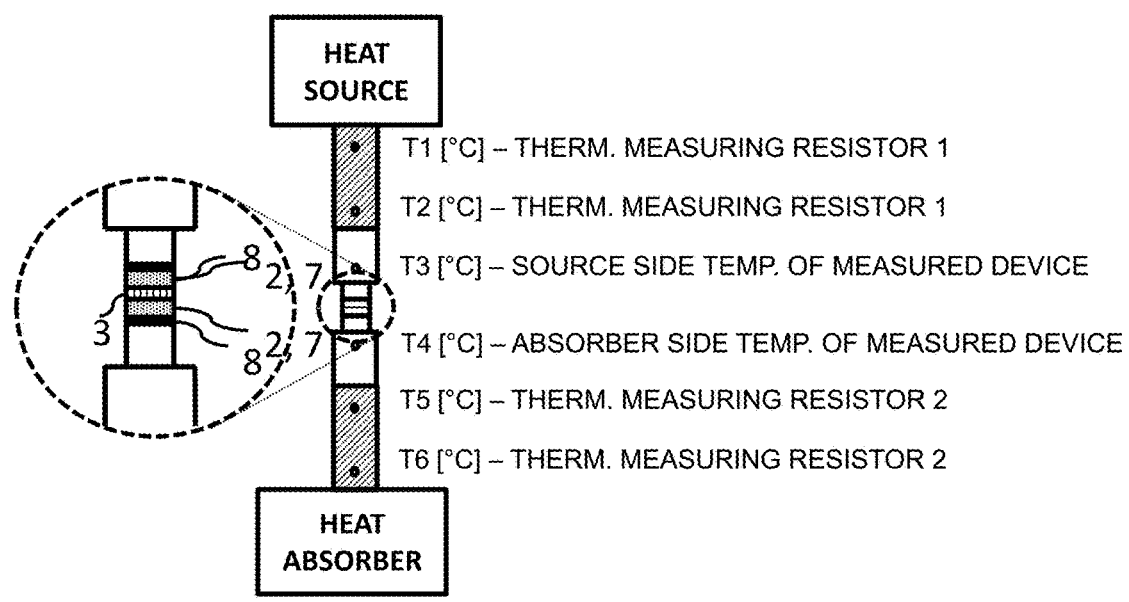
FIG. 12 is a schematic arrangement of the measuring resistors during determination of the heat transfer coefficient HTC.

FIG. 12 schematically shows a setup by means of which the thermal resistance of a converter-cooling element assembly as shown in FIG. 2 can be evaluated independently of the optical assembly in which it is operated. In order to determine the thermal resistance of a measured device (e.g. a soldered converter), this device is soldered to a Cu carrier and is contacted to a heat source on one end and to a heat sink on the other end. Thermal flux is determined by means of a "thermal measuring resistor".

In the measurement setup, temperature measuring points T1/T2 are available for determining the thermal flux in an upper measuring resistor. T5/T6 are the measuring points of a lower measuring resistor.

Therebetween, the device to be measured is arranged between two Cu carriers with temperature measuring points T3 and T4, where a temperature difference T3−T4 is determined. This is illustrated in FIG. 12.

The quotient of temperature difference and thermal flux is the thermal resistance of the measured device. The reciprocal of thermal resistance divided by the surface area of the measured device gives the HTC.

The following devices to be measured were used:

Measurement 1: ceramic converters of size 5.2 mm×5.2 mm, soldered to Cu carriers (T3/T4), which converters in turn were interconnected by two-component glue.

Measurement 2: the Cu carriers (T3/T4) directly connected by two-component glue.

With this experimental setup, the thermal resistance of a converter-cooling element assembly is given by 0.5*(thermal resistance of measurement 1−thermal resistance of measurement 2).

The thermal measuring resistor for measuring the thermal flux is made of steel 1.4841 (material name×15 CrNiSi 25 20). It has a diameter of 10 mm, a length of 10 mm, and two bores for thermocouples at a spacing of 7 mm. Across these thermocouples with a spacing of 7 mm a temperature difference is measured which can then be converted into a thermal flux using the thermal resistance calculated from the material data of the steel. The thermal resistance of this "measuring resistor" is between 7.5 and 10 K/W, depending on the temperature of the resistor in a range of up to 100° C. Table 4 shows the dependency of the thermal resistance of the measuring resistor from temperature.

TABLE 3

Approximation of the expected thermal resistances of the measuring resistor

| Thermal conductivity [W/m * K] | Length [mm] | Diameter [mm] | Area [mm$^2$] | Thermal resistance [K/W] | HTC [W/m$^2$K] |
|---|---|---|---|---|---|
| 11.9 | 7 | 10 | 78.54 | 7.49 | 1700 |
| 13.3 | 7 | 10 | 78.54 | 9.57 | 1330 |

TABLE 4

Thermal conductivities of measuring resistor

| Temperature [° C.] | Thermal conductivity [W/m * K] |
|---|---|
| 20 | 11.9 |
| 100 | 13.3 |
| 200 | 15.1 |
| 300 | 16.7 |
| 400 | 18.3 |
| 500 | 19.8 |
| 600 | 21.3 |
| 700 | 22.8 |
| 800 | 24.3 |
| 900 | 25.7 |
| 1000 | 27.1 |

TABLE 5

Thermal resistances and HTC of the evaluated converter-cooling element assemblies (OC = optoceramic)

| Assembly | Material | Therm. conductivity [W/m*K] | Length or thickness [mm] | Diameter [mm] | Area [mm$^2$] | Therm. resistance [K/W] | HTC [W/m$^2$K] |
|---|---|---|---|---|---|---|---|
| OC (200 μm) glued | OC | 6 | 0.2 | 5.2 × 5.2 | 27.04 | 1.23 | 30,000 |
| | silicone glue | 0.3 | 0.01 | 5.2 × 5.2 | 27.04 | 1.23 | 30,000 |
| | OC with silicone glue | | | 5.2 × 5.2 | 27.04 | 2.47 | 15,000 |
| OC (200 μm) soldered | OC | 6 | 0.2 | 5.2 × 5.2 | 27.04 | 1.23 | 30,000 |
| | Ag paste reflector | 430 | 0.005 | 5.2 × 5.2 | 27.04 | 0.00 | 86,000,000 |
| | solder layer | 67 | 0.08 | 5.2 × 5.2 | 27.04 | 0.04 | 837,500 |
| | OC soldered | | | 5.2 × 5.2 | 27.04 | 1.28 | 28,963 |
| OC (50 μm) glued | OC | 6 | 0.05 | 5.2 × 5.2 | 27.04 | 0.31 | 120,000 |
| | silicone glue | 0.3 | 0.01 | 5.2 × 5.2 | 27.04 | 1.23 | 30,000 |
| | OC with silicone glue | | | 5.2 × 5.2 | 27.04 | 1.54 | 24,000 |
| OC (50 μm) soldered | OC | 6 | 0.05 | 5.2 × 5.2 | 27.04 | 0.31 | 120,000 |
| | Ag paste reflector | 430 | 0.005 | 5.2 × 5.2 | 27.04 | 0.00 | 86,000,000 |
| | solder layer | 67 | 0.08 | 5.2 × 5.2 | 27.04 | 0.04 | 837,500 |
| | OC soldered | | | 5.2 × 5.2 | 27.04 | 0.35 | 104,961 |

Table 5 shows that for the conventional system used heretofore (ceramic converter of 200 μm thickness, glued with silicone), the thermal resistance of the converter and the resistance of the silicone glue connection are approximately the same (1.23 K/W).

By contrast, in the converter-cooling element assembly according to the invention with a metallic solder connection, the thermal resistance is determined by the resistance of the converter so that the thermal resistance of the converter assembly is almost halved due to the soldering as compared to the glued implementation.

The thinner the converter, the more determining becomes the difference in thermal conductivity of the connecting layer itself (silicone or solder), since in this case the resistance of the converter is less significant. In case of a converter having a thickness of only 50 μm, the thermal resistance of the soldered embodiment is already more than four times smaller than that of the glued variation.

In case of highly localized heat introduction (e.g. via a laser spot) it has to be observed that it is no longer the total surface area of the converter that contributes to heat conduction, but a section which is roughly given by the size of the laser spot. In this case, the relative contribution of the ceramic to the thermal resistance is the greater, the smaller the beam spot is. This is illustrated in Table 6.

spectral components compared to the shorter wavelength spectral components of the secondary spectrum, which can also be seen in FIG. 9. This effect might even be more pronounced in case of other metal-containing coatings, which contain for instance gold, so that it can be used for selectively controlling the chromaticity coordinate of the converter-cooling element assembly.

Figure 13:
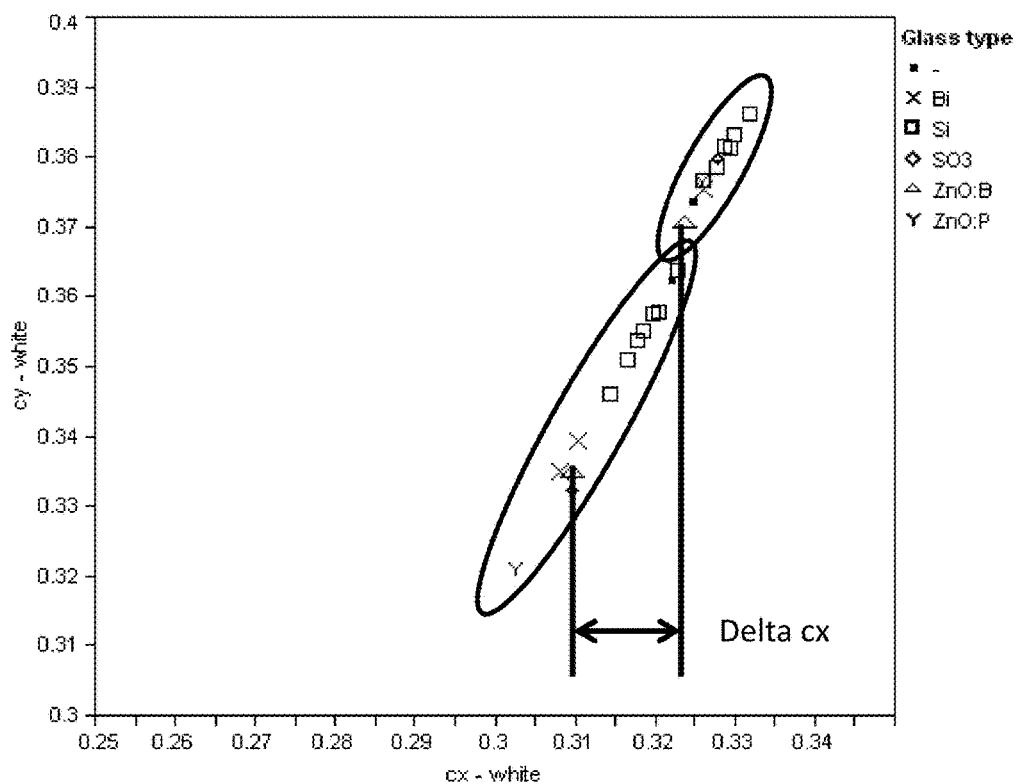
FIGS. 13 and 14 illustrate the quality of different embodiments of converters with metallic coating as evaluated based on chromaticity coordinates.
Figure 14:
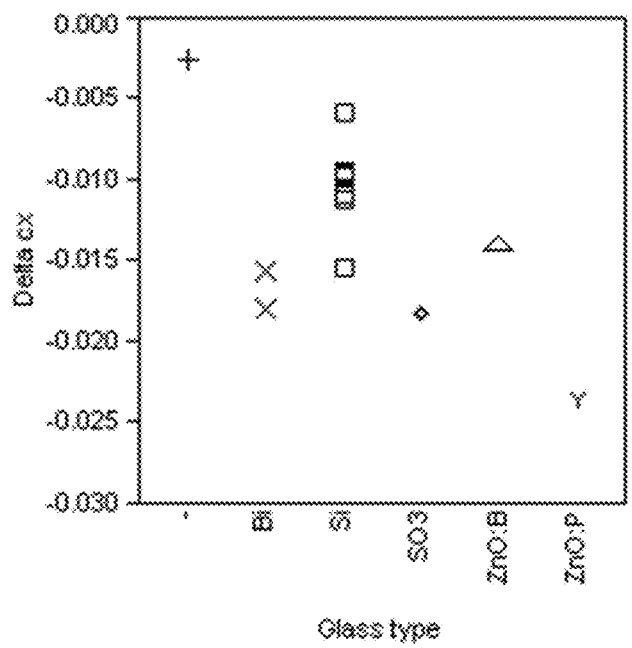

FIG. 14 shows the determined color location shifts $D_{cx}$ of FIG. 13 as a function of the glass system used in the metallic reflector. A small color location shift is characteristic for a good reflector. In addition to the Ag coating without glass content, the reflectors based on silicate glass exhibit the best reflective properties.

Exemplary embodiment: Connecting of the metal-containing coating and the cooling element by soldering The copper cooling elements or copper cooling elements protected against corrosion by a nickel-gold layer are placed in a sample holder so that the surface to be soldered is aligned horizontally and is virtually flush with the sample holder. Then a solder mask is placed thereupon, which has a thickness of 100 μm, and is aligned using adjustment pins. Solder paste (Heraeus F169 SA4005-86 D30) is applied onto the solder mask and is spread over the apertures with a doctor knife.

TABLE 6

Dependence of thermal resistance from the beam spot size

| Material | Therm. conductivity [W/m*K] | Length or thickness [mm] | Diameter [mm] | Area [mm$^2$] | Therm. resistance [K/W] | HTC [W/m$^2$K] |
|---|---|---|---|---|---|---|
| Optoceramic | 6 | 0.2 | 5.2 × 5.2 | 27.04 | 1.2 | 30,000 |
| Optoceramic (Beam spot D = 0.4) | 6 | 0.2 | 0.4 | 0.13 | 265.3 | 30,000 |
| Optoceramic (Beam spot F = 0.08) | 6 | 0.2 | | 0.08 | 416.7 | 30,000 |

FIG. 13 illustrates the shift of chromaticity coordinates in the CIE 1931 color space as caused by the metallic reflector, for pastes including different glass components. Measurement data of the samples measured on a highly reflective ALANOD mirror (R=98%) prior to metallization are located within the upper right ellipse (HR reference measurement). Measurement data of the same samples but with metallic coating are located within the ellipse more to the left and below. Chromaticity coordinate shift $D_{cx}$ is exemplified for one sample. Since the chromaticity coordinates for the dark reference measurements of the converters on a dark background or on a beam trap are not available in this case, $FOM_{CIE-cx}$ (see FIG. 6) cannot be calculated in this case. However, since all samples comprise metalized converters of identical converter material and identical thickness, $D_{cx}$ is appropriate for evaluating the reflectors in this case.

Furthermore, it is clearly apparent that the color locations of the converters prior to and following the metallic coating are not located on a straight line. That means, the metallic reflector not only has an effect on the ratio between excitation light and secondary light, but in the present example additionally leads to a relative increase in red color components and thus causes an offset of the color location line of the converters provided with the metallic coating to the right and downwards in the CIE 1931 chromaticity diagram. This is caused by a stronger reflection of the longer wavelength After lifting the solder mask, the ceramic converters are placed on the so formed solder paste fields. Then, a fixing aid may be placed on the sample holder, and the entire assembly is placed on a heating plate. After the solder has softened (at 215° C.), the entire assembly is removed from the heating plate after a holding time of 20 seconds. After cooling, the samples need to be freed of residual flux agents. This is accomplished in an ultrasonic bath in ethanol at 40° C. and an exposure duration of 10 minutes.

When soldering converters having a metallic reflector, it becomes apparent that solderability is highly dependent on the amount of glass used in the paste. Ag pastes with a silicate glass content, for example, exhibit poor wetting during the soldering process in case of a relatively high glass content of 1.5 wt %. With decreasing glass content the wetting improves. Even a glass-free Ag paste exhibits excellent wetting. In case of a glass-free Ag paste, however, reflection is impaired by the soldering process, which is already visually recognizable by a darker appearance of the soldered converter with silver-containing coating compared to the not yet soldered converter with silver-containing coating. For the soldering process described in the exemplary embodiment, a silver-containing coating with a silicate glass content of 0.5 wt % is particularly advantageous, since in this manner good solder wetting is achieved without impairing reflection.

It will be apparent from the exemplary embodiment that the metallic coating, the solder that is used, and the soldering process have to be adapted to one another. When using another solder or another soldering process, other glass components are conceivable which still allow for good solder wetting without impairing reflection.

Converter-cooling element assemblies produced by this soldering process were subjected to a thermal cycle test from −40° C. to +160° C. with two cycles per day for 10 days, with not a single case among 20 tested converter-cooling element assemblies, in which the converter would have become detached from the cooling element.

According to one variation of the exemplary embodiment, a solder furnace is used for the soldering process instead of the hot plate, which permits to better achieve the heating curves required for the solder.

LIST OF REFERENCE NUMERALS

1 Primary light
2 Converter
3 Glue
4 Mirror
5 Cooling element
6 Secondary light
7 Metal-containing coating
8 Solder connection
9 Ceramic converter
10 Silver-containing coating
11 Interface
12 Pores
13 Glass gusset
14 Heat sink
15 Thermal flux
16 $SiO_2$-tungsten layer stack

What is claimed is:

1. A converter-cooling element assembly, comprising:
a ceramic converter for at least partial conversion of light having a first wavelength into light having a second wavelength;
a reflective coating comprising metal and glass, wherein the metal is selected from the group consisting of silver, gold, platinum, and alloys thereof, at least portions of a surface of the ceramic converter being directly coated with the reflective coating; and
a heat sink is connected with the reflective coating via a metallic solder connection so that the reflective coating dissipates heat from the ceramic converter into the heat sink, wherein the metallic solder connection comprises tin-containing lead-free solder.

2. The assembly as claimed in claim 1, further comprising a thermal heat transfer coefficient of at least 25,000 W/m²K for at a converter thickness of 200 μm.

3. The assembly as claimed in claim 2, wherein the thermal resistance is less than 1.5 K/W.

4. The assembly as claimed in claim 1, wherein the reflective coating comprises silver having a silver content of at least 90 wt %.

5. The assembly as claimed in claim 1, wherein the reflective coating has a layer thickness from 50 nm to 30 μm.

6. The assembly as claimed in claim 1, wherein the reflective coating has a glass content from 0.05 to 10 wt %.

7. The assembly as claimed in claim 6, wherein the glass has a glass transition temperature in a range from 300 to 600° C.

8. The assembly as claimed in claim 6, wherein the glass has a refractive index $n_{D20}$ in a range from 1.4 to 2.0.

9. The assembly as claimed in claim 6, wherein the glass is selected from the group consisting of PbO glass, $Bi_2O_3$ glass, ZnO glass, $SO_3$ glass, and silicate-based glass.

10. The assembly as claimed in claim 6, wherein the glass is a silicate-based glass having a $SiO_2$ content of more than 25 wt %.

11. The assembly as claimed in claim 1, wherein the heat sink exhibits a thermal conductivity of more than 300 W/mK.

12. The assembly as claimed in claim 1, wherein the heat sink is a heat absorber.

13. The assembly as claimed in claim 1, wherein the ceramic converter is configured as a transmission arrangement with at least a portion of the reflective coating being positioned on a lateral surface of the ceramic converter.

14. The assembly as claimed in claim 1, wherein the ceramic converter is configured as a remission arrangement with at least a surface of the ceramic converter that is positionable away from an excitation light source being coated with the reflective coating.

15. The assembly as claimed in claim 1, further comprising a quality of reflection $FOM_{CIE-cx}$ defined as:

$$FOM_{CIE-cx} = \frac{c_x(\text{measured sample}) - c_x(Ref_{0R})}{c_x(Ref_{HR}) - c_x(Ref_{0R})}.$$

is at least 40%;
wherein $c_x$(measured sample) is a chromaticity coordinate of the ceramic converter provided with the reflective coating as determined in remission for a CIE 1931 standard color system;
$c_x(Ref_{HR})$ is a chromaticity coordinate of the ceramic converter as determined while applied on an ALANOD mirror having a reflectance of 98%; and $c_x(Ref_{HR})$ is a chromaticity coordinate of the ceramic converter as determined while applied on a dark background or a light trap.

16. The assembly as claimed in claim 1, wherein the heat sink comprises a copper-containing core and a coating applied thereto.

17. The assembly as claimed in claim 16, wherein the coating comprises a nickel-containing coating and/or a gold-containing coating.

18. The assembly as claimed in claim 1, wherein the reflective coating is a sintered coating.

19. A method for producing a converter-cooling element assembly, comprising the steps of:
providing a ceramic converter with at least one polished surface;
providing paste comprising a metal powder and a glass powder in an organic pasting medium, wherein the metal powder comprises a metal selected from the group consisting of silver, gold, platinum, and alloys thereof;
applying the paste onto at least a portion of the polished surface;
drying the paste;
firing the ceramic converter and having the pasted dried thereon at a firing temperature above 450° C. to form a metal-containing and glass-containing reflective coating; and
soldering a cooling element to the reflective coating with a metallic solder comprising a tin-containing lead-free solder.

20. The method as claimed in claim 19, wherein the paste comprises 70 to 90 wt % silver powder.

21. The method as claimed in claim 19, wherein the glass powder has a D50 value in a range from 1 to 5 µm.

22. The method as claimed in claim 19, wherein the glass powder comprises glass having a glass transition temperature in a range from 300 to 600° C.

23. The method as claimed in claim 19, wherein the step of applying the paste onto the polished surface comprises printing the paste onto at least the portion of the polished surface.

24. The method as claimed in claim 19, wherein the step of drying the paste comprises drying at a drying temperature from 150 to 400° C.

25. The method as claimed in claim 19, wherein the firing temperature is in a range from 700° C. to 1000° C.

26. The method as claimed in claim 19, wherein the firing step comprises sintering the metal-containing and glass-containing reflective coating.

27. The method as claimed in claim 19, wherein the metallic solder comprises silver.

* * * * *